Figure 1:
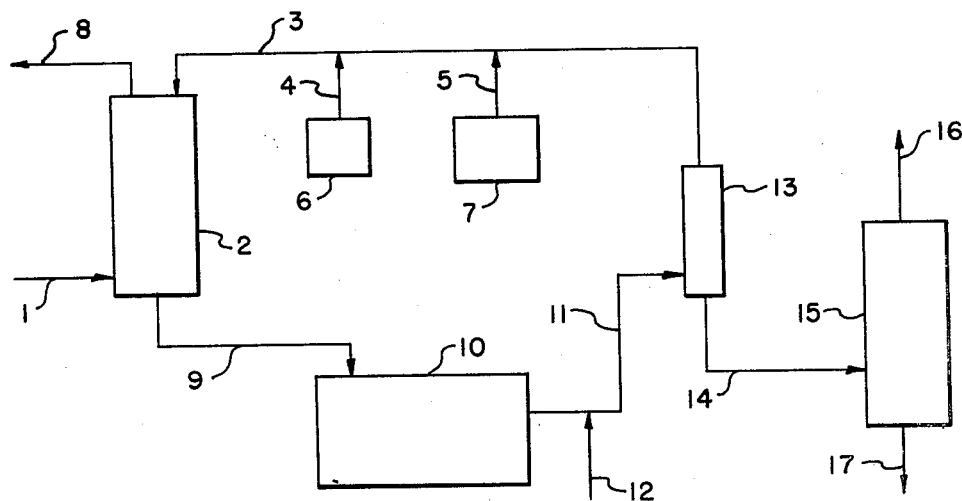
Figure 2:
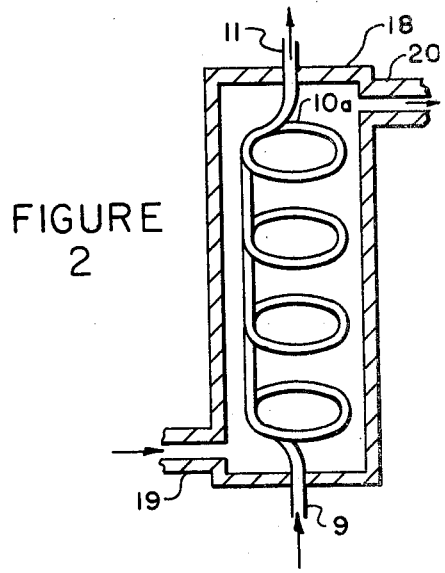
Figure 3:
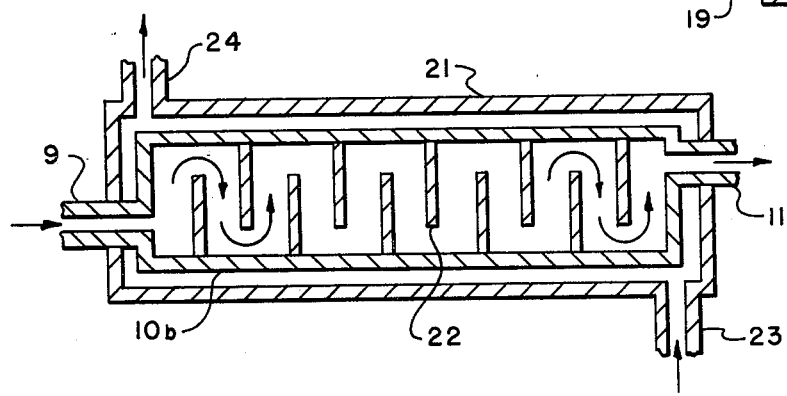

July 28, 1964 A. STURZENEGGER 3,142,700

PREPARATION OF ISOPROPENYL ACETATE

Filed Aug. 4, 1961

3,142,700
PREPARATION OF ISOPROPENYL ACETATE
August Sturzenegger, Cedar Grove, N.J., assignor to Hoffmann-La Roche Inc., Nutley, N.J., a corporation of New Jersey
Filed Aug. 4, 1961, Ser. No. 129,358
9 Claims. (Cl. 260—488)

This invention relates to a novel process. More specifically, it relates to the preparation of isopropenyl acetate by the reaction of acetone and ketene.

Ketene is a valuable industrial chemical used as a reactant in many large volume continuous industrial processes. In the great majority of these reactions it is used in gaseous form. Since very few of these reactions achieve 100% conversion of the ketene, there is usually resultant a gas effluent which comprises very small amounts of ketene, usually less than about 10% ketene by volume of the gas, in mixture with a large variety of waste gases. One typical industrial process is that set forth in U.S. Patent 2,802,872. That patent describes the dimerization of ketene to diketene. It can be seen from column 4 of said patent that, in the process there described, unabsorbed gases containing a small amount of ketene are vented through alkali scrubbers. This venting of unconverted ketene is typical of industrial processes utilizing ketene as a starting material. This off gas is so lean in ketene that, to the present time, it was thought uneconomical to attempt to salvage said ketene.

One purpose of the present invention is to provide an economical process to utilize lean ketene gases which have been previously treated as waste.

Isopropenyl acetate is a chemical intermediate of known value, for example, in U.S. Patent 2,902,863 a process for the manufacture of vitamin A acetate is described wherein isopropenyl acetate is one of the starting materials. When used as a starting material in such a process, the isopropenyl acetate should exhibit a high degree of purity and be substantially free of acidic content.

It has been known in the prior art to prepare isopropenyl acetate by the reaction of ketene and acetone. For example, U.S. Patent 2,383,965 shows such as a batch process. For industrial purposes, however, batch processes are usually uneconomical and involve certain known inefficiencies. Therefore, there have been attempts in the prior art to develop a continuous process for reacting acetone with ketene. One such process is outlined in U.S. Patent 2,481,669. The patentees therein describe a process for reacting acetone with ketene which comprises "absorbing ketene in acetone containing a condensation catalyst, such as sulfuric acid, at a pressure preferably below 150 mm. and at a temperature within the range of −50° C. to −10° C., and thereafter causing the ketene to react with the acetone, for example, at or above atmospheric pressure and at a temperature within the range of 30° C. to 100° C., preferably at 65–70° C." It is readily apparent that this process comprehending operation at subatmospheric pressures and very low temperatures, involves the necessity of expensive processing equipment, such as refrigeration equipment, and comprehends process conditions which are difficult and expensive to maintain. Other attempts in the art to achieve an economical process for the reaction of acetone with ketene to produce isopropenyl acetate have involved the assay of numerous exotic catalysts, which for the most part possess various disadvantages such as being either difficultly obtainable, difficult to handle, or high in cost. Typical of these prior art catalysts are the following: halosulfonic acids, oleum, alkyl sulfuric acids, sulfamic acids, acylsulfocarboxylic acids, phosphoryl sulfate, phosphorus oxychloride, naphthalene disulfonic acid or a reaction product thereof with acetic anhydride or ketene, polyphosphoric acid, and aliphatic mono- and di-sulfonic acids. Some of these acidic catalysts are difficult to separate from the end-product isopropenyl acetate and thus, when the intended end use of the isopropenyl acetate requires a high degree of purity, isopropenyl acetate produced by a process utilizing these catalysts is not acceptable.

All these various prior art processes, i.e., the batch process of U.S. Patent 2,383,965, the continuous process of U.S. Patent 2,481,669, and the processes involving different catalysts, contemplated the use of rich ketene gases prepared by the pyrolysis of acetone. These gases would average 25–40% ketene by volume on an acetone free basis. None of these processes contemplated working with lean ketene gases containing less than about 10% by volume ketene. None of these processes will economically and efficiently serve to convert lean ketene gas to isopropenyl acetate via reaction with acetone.

A purpose of the present invention is to provide a continuous process for the conversion of ketene to isopropenyl acetate via reaction with acetone which involves the use of economical acidic condensing agents, such as sulfuric acid, and the use of economical processing conditions. Another purpose of the present invention is to provide a process for the conversion of ketene to isopropenyl acetate via reaction with acetone which yields a highly pure isopropenyl acetate end product having substantially none or very small amounts of acidic content. Another purpose of this invention is to provide a process for the conversion of ketene to isopropenyl acetate via reaction with acetone which is continuous and operative with extremely lean ketene gases, which heretofore have been treated as waste.

The invention relates to a process of reacting ketene with acetone to form isopropenyl acetate wherein as a first step ketene is dissolved in acetone, and as a second step ketene and acetone are permitted to react in the presence of an acidic catalyst, said second step of ketene-acetone reaction being substantially separate from said first step of ketene dissolution. In a broad aspect of the invention, said absorption step comprises dissolving ketene gas in a liquid stream containing acetone and an acidic catalyst under conditions of turbulent flow, superatmospheric pressure and elevated temperature; and said reaction step comprises flowing a solution containing ketene, acetone and acidic catalyst through an extended reaction zone in substantially laminar liquid flow. More specifically, the invention relates to a continuous process of reacting ketene and acetone to obtain isopropenyl acetate, which comprises a step of effecting absorption by continuously dissolving ketene gas in acetone containing an acidic catalyst under conditions of turbulent flow at a pressure of from about 20 p.s.i.g. to about 100 p.s.i.g. and at a temperature of from about 20° C. to about 100° C., and a substantially separate step of effecting reaction by continuously passing the resultant solution through an extended reaction zone in substantially laminar liquid flow at a temperature of at least 50° C., preferably between 60° C. and 80° C. Furthermore, the invention relates to the removal of the acidic catalyst from the extended reaction zone product stream. More specifically, the acidic catalyst is removed by treating said product stream with a nonaqueous base mutually miscible with acetone and isopropenyl acetate and subsequently effecting separation.

An especially preferred embodiment of the invention comprises as a first step the absorption of lean ketene gas (i.e., gas containing less than about 10% ketene by volume) in acetone containing an acidic catalyst under conditions of turbulent flow, superatmospheric pressure and elevated temperature; and as a second step the flowing of the resultant solution of ketene, acetone, and acidic catalyst through an extended reaction zone in substantially laminar liquid flow.

The invention is further disclosed in the following description and the accompanying single sheet of drawing wherein equivalent structures are identified by like reference characters, and wherein FIGURE I is a diagrammatic representation of one form of apparatus in which the invention can be practiced;

FIGURE II is a diagrammatic sectional representation of a form of reactor for use in practicing the invention;

FIGURE III is a diagrammatic sectional representation of a second form of reactor for use in practicing the invention.

Referring more particularly to FIGURE I, no pumps, heat exchangers or process control equipment are illustrated therein, the location and selection of such equipment being within the skill of the art. More particularly referring to FIGURE I, the line 1 represents a conduit means for introducing feed gas into absorber 2. Line 3 represents a conduit means for conducting a liquid feed into absorber 2. Lines 4 and 5 represent conduit means for introducing liquid feed components from storage tanks 6 and 7, respectively, into the liquid feed stream flowing through conduit means 3 into absorber 2. A conduit means 8 conducts unabsorbed gases away from absorber 2. Line 9 represents a conduit means for introducing liquid feed into reactor 10. Conduit means 11, which removes the liquid stream from reactor 10, is provided with conduit means 12 for intermixing said liquid stream flowing from reactor 10 with a treating liquid. Conduit means 11 introduces said treated liquid into separator 13. One of the fractions obtained in separator 13 is conducted by conduit means 3 to absorber 2, conduit means 14 conducts crude liquid product from separator 13 to separator 15, from which separated vapors are withdrawn by conduit means 16 and separated liquid is withdrawn by conduit means 17.

The apparatus should be constructed of materials which assert no deleterious effect on ketene, acetone or isopropenyl acetate. Whenever metal parts come in contact with the feed materials or product materials, the use of stainless steel is preferred. Conventional commercially available apparatus can be used for most of the components shown in FIGURE I. For example, the absorber 2 may advantageously be a conventional absorption column into which the gas stream and liquid stream are introduced in counter-current flow and which is provided with suitable packing to insure turbulence and provide good contact between gas and liquid. Separators 13 and 15 may advantageously be conventional distillation columns. Intimate mixing of vapor and reflux can be provided for by bubble-cap plates, sieve plates, or packing.

In the apparatus shown in FIGURE I the various loci wherein diverse conduit means meet, i.e., different liquid streams are mixed, such as where conduit means 4 and 5 join 3, and where means 11 joins means 12, can be conventional liquid mixing means, for example, surge tanks.

As stated above, the reactor 10 should be one which affords an extended reaction zone and should be designed to offer as little resistance to liquid flow as possible, taking into account the required throughput capacity of a system. Ideally, such a reactor is a narrow elongated pipe of circular cross section, such reactor being, inter alia, useful in installations where only small throughput capacity is reqpired. The pipeline reactor operates most efficiently when extended in a straight line, but may be arranged in some other manner in order to conserve space, e.g., in a helix, for instance as illustrated in FIGURE II of the drawings.

In FIGURE II, the reaction zone is represented by helical pipe 10a, surrounded by a jacket 18 to enclose a circulating heat exchange medium. Conduit means 9 is provided for introducing the liquid feed into reaction zone 10a from the absorber 2 shown in FIGURE I. Conduit means 11 is provided for withdrawing liquid product stream from reaction zone 10a into separator 13 shown in FIGURE I. Conduit means 19 and 20 are, respectively, in-put and out-put means for introduction and withdrawal of heat exchange medium from jacket 18.

In large scale commercial operation pipeline reactors are not desirable because they require excessive amounts of tubing and because they are not compact. A suitable form of reactor for commercial scale operation is illustrated in FIGURE III. Such a reactor may take the form of a cylindrical tank 10b provided with a jacket 21. The tank is provided with vertical baffles 22 alternately extending from the top and bottom thereof and providing an elongated path of flow for the liquid stream passing through the tank. The symbols 9 and 11 represent respectively the in-put conduit means to the reactor 10b and the out-put conduit means from the reactor 10b. The symbols 23 and 24 represent respectively in-put conduit means into jacket 21 and out-put conduit means from jacket 21. If required to provide adequate throughput capacity, a number of reactors, such as illustrated in FIGURE II and FIGURE III, can be connected in series.

In practicing the process of the invention in the apparatus shown diagrammatically in FIGURE I, a feed gas is introduced through conduit means 1 into absorber 2. As exemplary of the feed gas contemplated by the preferred embodiment of the invention is an industrial waste gas containing very minor amounts of ketene, the remainder of the gas being such gaseous industrial by-products as methane, carbon monoxide, ethylene, and the like. A liquid feed stream is fed through conduit means 3 into absorber 2. The liquid stream contains acetone and a small amount of acidic catalyst. When the process is first commenced, the liquid stream will contain nothing but acetone and acidic catalyst drawn into conduit means 3 by conduit means 4 and 5 from storage tanks 6 and 7 respectively. However, as the process proceeds and achieves steady state, a substantial amount of the acetone will represent recycled acetone drawn into conduit means 3 from separator 13. The liquid stream leaving absorber 2 through conduit means 9 will contain liquid acetone, acidic catalyst, ketene, isopropenyl acetate and minor quantities of impurities. This liquid stream is passed in laminar flow from conduit means 9 into reactor 10 where the desired reaction between acetone and ketene primarily takes place. The reaction product stream is withdrawn from reactor 10 through conduit means 11 and will principally contain acetone, isopropenyl acetate, acidic catalyst, unconverted ketene and reaction by-products. Typically the reaction product stream will contain by weight; acetone 10%–30%, isopropenyl acetate 55%–65%, and residues (catalyst, etc.) 10%–15%.

A fraction of the reaction product stream flowing from reactor 10 can be withdrawn and directly recycled through a conduit means into conduit means 3 whereby it is conducted into absorber 2. The conduit means directly interposed between reactor 10 and conduit means 3 is not shown, as such is optional and if it is included, the fraction of the reaction product stream recycled is variable within the discretion of one skilled in the art. The reaction product stream not directly recycled (which can be the entire reaction product stream) is mixed with a non-aqueous base, which base is fed through conduit means 12 into conduit means 11. This so-treated liquid stream is then fed into separator 13 wherein excess acetone is separated and recycled through conduit means 3. The remainder of the liquid product stream, comprising essentially isopropenyl acetate, neutralized acidic catalyst, and reaction residues, is withdrawn from separator 13 through conduit means 14 into separator 15. From separator 15, the reaction product, isopropenyl acetate, is withdrawn through conduit means 16 while the neutralized acidic catalyst and reaction residues are withdrawn through conduit means 17. The reaction residues referred to above comprise numerous by-products of the reaction between ketene and acetone, such as $\beta,\beta$-dimethylpropionolactone, polymerization products of ketene, decomposition products of ketene and acetone, as well as some dissolved residual acetone.

In the initial process step, i.e., the absorption in absorber 2, unabsorbed gases are vented to suitable apparatus, e.g., alkali scrubbers or furnaces, through conduit means 8.

As stated above the absorption step should preferably be effected by passing the liquid stream containing acetone and acidic catalyst countercurrent to the ketene gas stream. This step is conducted under pressure while maintaining a state of turbulence in the absorber so as to obtain maximum contact between absorbant and absorbate. The reaction step, on the other hand, is conducted with the reactants in laminar flow. This effectuation of the present process in two substantially separate steps is one of the major factors of the invention. As indicated above, the reaction of acetone with ketene to form isopropenyl acetate is only one of many reactions which may occur involving these two reactants. In addition to isopropenyl acetate, acetone and ketene also react to form $\beta,\beta$-dimethylpropionolactone. Acetone self condenses to form diacetone alcohol, mesityl oxide, phorone, isophorone and mesitylene. Ketene will polymerize to yield diketene and ketene polymers. When sulfuric acid, the preferred acidic catalyst, is used, it too enters into side reactions; for example, acetone is esterified thereby to form isopropenyl sulfonate and ketene reacts therewith to form sulfoacetic acid and acetyl sulfoacetic acid. Due to these numerous and varied side reactions it is very important to maintain substantially uniform residence time in the reaction zone so that a first-in, first-out measurement of reactant holdup represents a fairly accurate picture of what is actually taking place. This is necessary so that the residence time for all the reactants is the minimum necessary to effect the desired reaction, and not any longer, as excess residence time in the reactor would lead to furthering the side reactions thereby detracting from the final yield of desired end product. Turbulent flow tends to produce non-equal residence times for the various fractional parts of the total liquid reaction mixture, so that certain parts of the reaction mixture remain in the reaction zone a substantially longer time than other parts. Thus an important factor in the process of the invention is to avoid turbulent flow in the reaction zone. This is achieved by substantially separating the reaction step from the absorption step, as previously described, and conducting the reaction step in substantially laminar liquid flow. Ideal laminar flow is unattainable in industrial size processing equipment, but very close approximations thereto can be achieved in actual apparatus such as previously described and illustrated in FIGURE II and FIGURE III of the drawing.

In addition to the laminar flow reaction zone above described the invention also comprehends other salient features. In order to minimize side reactions it has been found to be preferable to provide an excess of acetone over the amount stoichiometrically essential to react with the ketene. At steady state an excess of 15 to 30% of acetone is found preferable.

One of the most important features of the invention is that the complete process is conducted under superatmospheric pressure. It was found to be essential to the efficient conversion of the ketene in lean ketene gas that its absorption in acetone occurs under conditions of superatmospheric pressure. While there is no critical upper limit to the pressure which can be used, conditions of equipment availability, operating economy, etc., do dictate certain preferences. Accordingly, in the instant process it is preferred that the absorption step take place under conditions of superatmospheric pressure between 20 and 100 p.s.i.g. The reaction step will take place at a slightly lower pressure due to pressure drop in the apparatus.

To minimize side reactions it has been found preferable that the temperature in the reaction zone should not be less than 50° C. and should preferably be between 60° and 80° C. On the other hand the temperature in the absorption zone is preferably maintained at the lower end of the range prescribed, i.e., ideally it should be kept at the lower end of the range 20° C.–100° C. as the lower temperature tends to encourage better absorption. It may, however, be that for purposes of economy a particular practitioner of the process of the invention will maintain substantially the same temperature in the reactor and the absorber. Such, as well as the maintenance of a temperature in the reactor higher or lower than that in the absorber, is within the scope of the invention.

As discussed above the prior art has employed numerous different acidic catalysts for use in the subject reaction, i.e., the reaction of acetone and ketene to form isopropenyl acetate. One of the main features of the present invention is that perhaps the most economical and easiest to handle of these catalysts, sulfuric acid, can be used with a high degree of effectiveness in the process of the invention. The other catalysts can be used but, needless to say, their use is not preferred. It has been found that the concentration of catalyst is very important. Too little catalyst will not properly promote the reaction, too much catalyst will promote self condensation of acetone, ketene and decomposition of isopropenyl acetate. Ideally the concentration of sulfuric acid in the acetone feed stream to the absorber should be between .5 and 2% by weight of the total liquid feed to the absorber. When other catalysts are used, the preferred concentrations will, of course, differ.

Outside of economy and ready availability, one of the main advantages of using sulfuric acid as the catalyst is its ease of separability from the product stream according to a process of the invention. It has been found that the sulfuric acid can be separated from said product stream by simply mixing the product stream with a non-aqueous base miscible with the product stream, i.e., miscible with acetone and isopropenyl acetate. Substantially pure isopropenyl acetate can then easily be obtained by distilling the product stream and removing the neutralized catalyst as bottoms, as for example in separator 15 shown in FIGURE I.

As pointed out above it is essential that the isopropenyl acetate contain substantially no remnant of the acidic catalyst in order that the isopropenyl acetate can be used as a starting material for various industrial reactions. It has been found that lower alkyl substituted pyridines are particularly efficacious bases for use in removing acidic catalysts from the product reaction stream.

The amount of non-aqueous base used is not critical, but it should of course be sufficient to achieve substantial neutralization of the acidic catalyst. Thus the quantity of non-aqueous base used can be equimolar to the acidic catalyst or can be in a large excess thereof. For purposes of economy it is of course desirable to use as little non-aqueous base as possible. It has been found that using the non-aqueous base in a 50% molar excess to the catalyst represents an efficient balancing of these factors. Needless to say, other workers in the art may find it more convenient to work with different molar ratios of non-aqueous base to acid catalyst, and such would not be a departure from the scope of the present invention.

As stated above lower alkyl substituted pyridines have been found particularly efficacious as the non-aqueous bases used to treat the reaction product stream. Illustrative of lower alkyl pyridines which can be used are $\beta$ and $\gamma$ picolines, methylethylpyridine (aldehydine), and the like. These lower alkyl pyridines can be used either alone or in mixture. They can be fed through conduit 11 in substantially pure form as liquids, or they can be diluted with a suitable solvent, conveniently acetone.

The following examples are illustrative but not limitative of the invention. As can be appreciated from the above discussion there are certain critical features appurtenant to the invention, such as the use of superatmospheric pressure and a laminar flow reaction step substantially separate from the absorption step. It should also be appreciated that within the skill of the art other variables can be subject to wide variation. Such variations are, of course, within the scope of the instant invention.

In the following examples all temperatures are in degrees centigrade.

Example 1

A ketene feed gas containing by volume, ketene 34.7%, methane 46.9%, carbon monoxide 12.2%, and ethylene 6.2% is introduced through conduit 1 into absorber 2 in the apparatus shown in FIGURE I at the rate of 1500 g. of ketene per hour, a temperature of 50–60° and a pressure of 21 p.s.i.g. Fresh acetone is introduced through conduit 4 into conduit 3 at the rate of approximately 3090 ml. per hour. Fresh acidic catalyst (sulfuric acid) is introduced through conduit 5 into conduit 3 in sufficient quantity to maintain an acid concentration of 1.4% by weight of the total liquid feed being introduced into absorber 2 through conduit 3. The quantity of reaction product stream directly recirculated from reactor 10 into conduit 3 is approximately 50 liters per hour. The reaction vessel of the type shown in FIGURE III is used and is of a sufficient size to provide a total holdup of 35 liters. The reaction vessel is held at approximately the same temperature as the absorber. Under these conditions 96.9% of the ketene in the initial feed is converted.

Example 2

A ketene feed gas containing by volume, ketene 5.0%, methane 68.3%, carbon monoxide 17.8%, and ethylene 8.9% is introduced through conduit 1 into absorber 2 in the apparatus shown in FIGURE I at the rate of 140 g. of ketene per hour, a temperature of 48° and a pressure of 20 p.s.i.g. Fresh acetone is introduced through conduit 4 into conduit 3 at the rate of approximately 300 ml. per hour. Fresh acidic catalyst (sulfuric acid) is introduced through conduit 5 into conduit 3 in sufficient quantity to maintain an acid concentration of 0.7% by weight of the total liquid feed being introduced into absorber 2 through conduit 3. The quantity of reaction product stream directly recirculated from reactor 10 into conduit 3 is approximately 60 liters per hour. The reaction vessel of the type shown in FIGURE III is used and is of a sufficient size to provide a total holdup of 20 liters. The reaction vessel is held at approximately the same temperature as the absorber. Under these conditions 81.6% of the ketene in the initial feed is converted. 5 g. per hour of a technical mixture of $\beta$ and $\gamma$ picolines is fed through conduit 12 into conduit 11 and there mixed with the crude reaction product stream prior to distillation in separator 13.

Example 3

Ketene feed gas containing by volume, ketene 3.6%, methane 69.2%, carbon monoxide 18.1%, and ethylene 9.1% is introduced through conduit 1 into absorber 2 in the apparatus shown in FIGURE I at the rate of 150 g. of ketene per hour, a temperature of 60° and a pressure of 45 p.s.i.g. Fresh acetone is introduced through conduit 4 into conduit 3 at the rate of approximately 292 ml. per hour. Fresh acidic catalyst (sulfuric acid) is introduced through conduit 5 into conduit 3 in sufficient quantity to maintain an acid concentration of 2.8% by weight of the total liquid feed being introduced into absorber 2 through conduit 3. The quantity of reaction product stream directly recirculated from reactor 10 into conduit 3 is approximately 12 liters per hour. The reaction vessel of the type shown in FIGURE III is used and is of a sufficient size to provide a total holdup of 3 liters. The reaction vessel is held at approximately the same temperature as the absorber. Under these conditions 91.5% of ketene in the inital feed is converted. 25 g. per hour of methylethylpyridine (aldehydine) is fed through conduit 12 into conduit 11, wherein it is mixed with the crude reaction product stream prior to distillation in separator 13.

Example 4

A ketene feed gas containing by volume, ketene 2.3%, methane 70.1%, carbon monoxide 18.3%, and ethylene 9.3%, is introduced through conduit 1 into absorber 2 in the apparatus shown in FIGURE I at the rate of 1815 g. of ketene per hour, a temperature of 20° and a pressure of 5 atmospheres absolute. Fresh acetone is introduced through conduit 4 into conduit 3 at the rate of approximately 3660 ml. per hour. Fresh acidic catalyst (sulfuric acid) is introduced through conduit 5 into conduit 3 in sufficient quantity to maintain an acid concentration of 1.4% by weight of the total liquid feed being introduced into absorber 2 through conduit 3. The quantity of reaction product stream directly recirculated from reactor 10 into conduit 3 is approximately 10 liters per hour. The reaction vessel of the type shown in FIGURE III is used and is of a sufficient size to provide a total holdup of 8 liters. The reaction vessel is held at a temperature of approximately 60°. Under these conditions 95.5% of the ketene in the initial feed is converted.

I claim:

1. A continuous process for the production of isopropenyl acetate which comprises an absorption stage of continuously mixing under turbulent conditions, superatmospheric pressure, and a temperature between about 20° C. and about 100° C., a ketene gas feed containing less than about 10% ketene by volume and a liquid feed comprising acetone and an acidic catalyst; and a substantially separate reaction stage of passing the resulting solution through a reaction zone in substantially laminar flow at superatmospheric pressure and a temperature of at least about 50° C.

2. A process as in claim 1 wherein the temperature in the reaction zone is higher than that in the absorption stage.

3. A continuous process for the production of isopropenyl acetate which comprises an absorption stage of continously mixing under tubulent conditions, superatmospheric pressure, and a temperature between about 20° C. and about 100° C., a ketene gas feed containing less than about 10% ketene by volume, and a liquid feed comprising acetone and sulfuric acid; and a substantially separate reaction stage of passing the resulting solution through a reaction zone in substantially laminar flow at superatmospheric pressure and a temperature of at least about 50° C.

4. A continuous process for the production of isopropenyl acetate which comprises an absorption state of continuously mixing under turbulent conditions, a pressure of between about 20 p.s.i.g. and 100 p.s.i.g., and a temperature between about 20° C. and about 100° C., a ketene gas feed containing less than about 10% ketene by volume and liquid feed comprising acetone and sulfuric acid; and a substantially separate reaction stage of passing the resulting solution through a reaction zone in substantially laminar flow at superatmospheric pressure and a temperature of at least about 50° C.

5. A continuous process for the production of isopropenyl acetate which comprises an absorption stage of continuously mixing under turbulent conditions, superatmospheric pressure, and a temperature between about 20° C. and 100° C., a ketene gas feed containing less than about 10% ketene by volume and a liquid feed comprising acetone and acidic catalyst; a substantially separate reaction stage of passing the resulting solution through a reaction zone in substantially laminar flow at superatmospheric pressure and a temperature of at least about 50° C.; mixing with the resulting reaction product stream a non-aqueous base miscible therewith and selected from the group consisting of lower alkyl substituted pyridines and mixtures of lower alkyl substituted pyridines and separating substantially pure isopropenyl acetate from said resulting solution of base and reaction product stream by subjecting said resulting solution to distillation.

6. A process as in claim 3 wherein the acidic catalyst is sulfuric acid.

7. A process for obtaining purified isopropenyl acetate from a reaction product stream resulting from a liquid phase reaction wherein isopropenyl acetate is produced in the presence of an acidic catalyst which comprises mixing with said reaction product stream a non-aqueous base miscible therewith and selected from the group consisting of lower alkyl substituted pyridines and mixtures of lower alkyl substituted pyridines; and subjecting the resulting solution to distillation.

8. A process as in claim 5 wherein the acidic catalyst is sulfuric acid.

9. In a process for the separation of isopropenyl acetate from a reaction product stream resulting from a liquid phase reaction wherein isopropenyl acetate is produced in the presence of an acidic catalyst, the process which comprises mixing said reaction product stream with a non-aqueous base miscible therewith selected from the group consisting of lower alkyl substituted pyridines and mixtures of lower alkyl substituted pyridines and separating the isopropenyl acetate from the reaction product stream by subjecting the resulting solution to distillation.

References Cited in the file of this patent

UNITED STATES PATENTS

| | | |
|---|---|---|
| 2,164,012 | Hund et al. | June 27, 1939 |
| 2,228,038 | Schurink et al. | Jan. 7, 1941 |
| 2,383,965 | Gwynn et al. | Sept. 4, 1945 |
| 2,476,860 | Hagemeyer | July 19, 1949 |

OTHER REFERENCES

Rose: "The Condensed Chemical Dictionary," 5th edition 1956, page 919.